Fig. 1
Fig. 2
Fig. 3
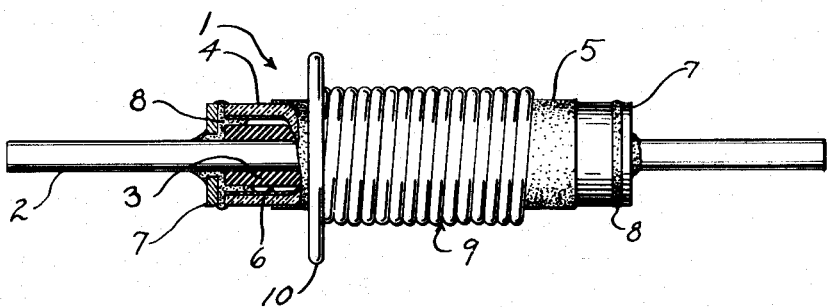
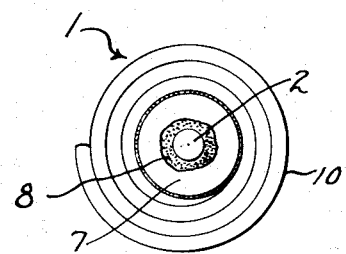
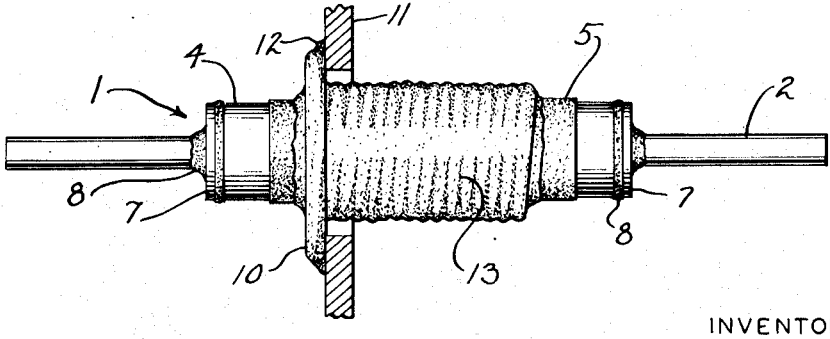
INVENTOR
William W. Garstang
BY Quarles, Fox, Seidel, Bateman & Hoser
ATTORNEYS

United States Patent Office 3,002,136
Patented Sept. 26, 1961

3,002,136
ELECTRICAL CIRCUIT COMPONENT HAVING RESILIENT WOUND SLEEVE
William W. Garstang, Fox Point, Wis., assignor to Allen-Bradley Company, Milwaukee, Wis., a corporation of Wisconsin
Filed Nov. 5, 1958, Ser. No. 772,089
3 Claims. (Cl. 317—242)

This invention relates to electric circuit components, and it more specifically resides in a component having a thin walled tubular dielectric and a sleeve of coiled resilient wire encircling the dielectric in firm, gripping relation therewith, such sleeve having spiral turns presenting a flange radial of the tube and a solder coating between turns lending rigidity thereto.

Small electronic circuit components, such as feed-through filters and capacitors employed to bypass very and ultra-high frequency currents from a conductor to a panel or chassis, are small in overall dimension, and consequently the ceramic parts are quite susceptible to breakage if abnormal mechanical stresses are encountered. For example, the dielectric of a tubular feed-through capacitor, or filter, frequently comprises a thin-walled ceramic tube encircling a central terminal, and as such the dielectric is exposed as a portion of the capacitor exterior. The ceramic material, due to its thin cross section, is friable and if excessive mechanical stresses are encountered, as may occur through abusive handling or thermal shock in solder operations, breakage may readily occur. Such unwanted mechanical stresses may occur in normal assembly operations, as where a suitable terminal is attached to the outer exposed surface of the ceramic tube. The outer surface is first coated with a thin metallic film that functions as a capacitor electrode, and a suitable means of making an electrical connection with this electrode must be incorporated in the completed component. Usual expedients for obtaining such electrical connection are to insert the ceramic dielectric within either a threaded bushing or an eyelet, and to then solder the bushing or eyelet to the electrode. Such bushings and eyelets present openings of fixed diameter, and since the fit of the thin ceramic dielectric within the opening should be snug, there is an attendant tight fit which induces undesirable mechanical stresses in the non-resilient ceramic. If, on the other hand, the ceramic dielectric fits loosely within the bushing or eyelet the amount of heat that must be employed to satisfactorily solder the parts to one another becomes considerable. Relatively high temperatures are required, with attendant thermally induced stresses. The possibility of fracture, or other mechanical damage, of the ceramic is increased, and production in mass numbers with but a small number of mechanical failures becomes most difficult to accomplish.

In the present invention the deficiencies of the foregoing practices are overcome by a novel use of a sleeve that lightly, but firmly, grips the ceramic dielectric. The sleeve comprises wound resilient turns yieldable to reduce mechanical stresses, while still providing an intimate physical contact with the electrode. Further, only low temperature solders need be employed in fixing the sleeve upon the capacitor. It is, therefore, an object of this invention to provide a capacitor, or filter, with a resilient sleeve to reduce stresses in the dielectric to a minimum.

It is another object of this invention to provide filters and capacitors in which low temperature solder may be used to secure an electrical connection to an electrode of the component.

It is another object of this invention to provide filters and capacitors having resilient sleeves which present mounting flanges for mounting the components in an opening of a panel.

It is another object of this invention to provide a sleeve for filters and capacitors which lightly grip the component dielectric without introducing deleterious mechanical stresses.

The foregoing and other objects and advantages of this invention will appear from the following description. In the description reference is made to the accompanying drawing which forms a part thereof, and in which there is shown by way of illustration and not of limitation a specific form in which the invention may be embodied.

In the drawing:

FIG. 1 is a side view, with parts broken away and in section, of a partially completed ceramic tubular filter in which the invention is embodied, FIG. 2 is an end view of the filter of FIG. 1, and FIG. 3 is a side view of the filter with solder applied to certain surfaces thereof to complete the same.

Referring now to the drawing, there is shown a tubular feed-through filter 1 having a wire terminal lead 2 that extends throughout the entire length of the filter 1 and emerges at each end, so that suitable electrical connection can be made thereto. In the particular form of filter shown in the drawing a ferrite bead 3, a portion of which is shown in FIG. 1, encircles the central portion of the terminal lead 2. Such a ferrite bead 3 is of fragile character and is incorporated in the filter 1 to present electrical properties, which in combination with the capacitor elements to be described, present a composite filter having desired low transfer impedance characteristics over a wide range of frequencies. Filters comprising a tubular capacitor and ferrite have been provided in various forms, and have presented low impedance over frequency spectrums extending as high as 5000 m.c.p.s. Such filters find a variety of applications, and it is essential that mechanical reliability is insured so that breakdowns will not occur.

Concentric with and closely surrounding the ferrite bead 3 is a thin walled tube 4 of dielectric material. For filters of the type under consideration, the dielectric must have a high K value and may be selected from the commonly employed titanates. Such dielectric material is ceramic in nature and is fired to achieve a solid uniform body. The wall thickness of this tubular ceramic may be as small as the order of .006 inch and as such the tube 4 is fragile to the point that internal stresses developed by heat or other assembly procedures may readily cause fracture.

Over the central portion of the outer cylindrical surface of the tube 4 there is deposited a capacitor electrode 5 consisting of a silver paste fired to form a thin metallic layer in tight intimate contact with the ceramic surface of the tube 4. A similar capacitor electrode 6 of fired silver paste is deposited on the entire inner cylindrical surface of the dielectric tube 4, such that it extends to the very end of the tube 4, while the electrode 5 stops short of the ends of the tube 4.

With the dielectric tube 4 in the position encircling the ferrite bead 3, end washers 7 are placed adjacent the ends of the tube 4 and are soldered in place by the use of a solder 8. The solder 8 makes an electrical contact between the inner electrode 6 and the washers 7, and between the washers 7 and the wire terminal lead 2, so that the inner electrode 6 is connected with the lead wire 2.

The assembly described thus far presents a tubular, ceramic, feed-through filter wherein the lead wire 2 affords a ready connection for the one capacitor electrode 6. It is also necessary to facilitate ready connection with the opposite capacitor electrode 5, and for this purpose it is desirable to place a form of connector about the thin walled tube 4 and its electrode 5. One form of connector heretofore employed has been a bushing threaded on its outer surface and incorporating a radially extending flange, such that the completed assembly may be inserted through an opening of a panel and by bringing up a nut on the threaded bushing the panel may be clampingly engaged between the nut and the flange. An alternative form of connector has been an eyelet that snugly fits about the ceramic tube 4. In each instance, the internal opening of the connector which receives the dielectric tube 4 is of fixed diameter. If the bushing or eyelet is to snugly receive the tube 4 internal mechanical stresses will necessarily be set up in the tube 4 as it is fitted within the bushing or eyelet. Such a stress may weaken the tube 4 and create a susceptibility to fracture. Further, a subsequent soldering of the bushing or eyelet to the electrode as a last step of manufacture may induce sufficient additional stress that fractures the tube 4.

In the present invention a wound sleeve 9 comprised of a resilient wire is preformed and then slipped over the ceramic tube 4. Such a sleeve 9 is shown in FIG. 1 in a position surrounding the electrode 5, preparatory to being fixed in place by the application of a low temperature solder. The sleeve 9 may, as an example, be composed of a .020 diameter piano type wire, with the diameter of the central opening of the sleeve 9 being slightly less than the outside diameter presented by the tube 4 and its electrode 5. In the example being described, the diameter of the completed ceramic tube 4 is .172 inch and the opening of the sleeve 9 is .167 inch. Then, when the sleeve 9 is slipped over the tube 4 it will resiliently grasp the same with an insured intimate, physical contact, but on the other hand no such mechanical force is exerted on the tube 4 as to induce harmful internal stress.

As shown in the drawing, the turns of wire forming the sleeve 9 travel helically along the tube 4 for a substantial distance, for the purpose of obtaining the desired physical union with the electrode 5, and then at one end of the sleeve 9 the turns form a spiral pattern, as clearly shown in FIG. 2. The spiral turns form a radially extending flange 10, to present a convenient means of mounting the filter 1. The filter 1 may be inserted through an opening in a panel or chassis with the flange 10 brought up against the panel. In FIG. 3 the filter 1 is shown mounted in such fashion, with the flange 10 being secured to a panel 11 by means of an appropriate solder 12.

In completing the manufacture of the filter 1 the sleeve 9, and particularly the flange 10, is stiffened, after placement about the tube 4, by an application of a low temperature solder to the surface thereof. Such a low temperature solder 13 is shown in FIG. 3, and the function of such solder 13 is to retain the sleeve 9 in place while also stiffening the flange 10 so that it will perform its function of presenting a surface by which the filter 1 may be mounted. By the term low temperature solder is meant a solder having a melting point below 450 degrees F., and by the use of such a low temperature solder the heat momentarily conveyed to the tube 4 will be small in amount, such that thermal stresses are minimal. Thus, the invention minimizes both thermal stresses and mechanical stresses, whereby a tubular filter, or capacitor, may be manufactured in mass number without breakage or fracture, as may be otherwise encountered.

The foregoing description, and the drawing, describe the invention in connection with a filter that comprises a magnetic material in the form of the ferrite bead 3 and a capacitor having the tubular dielectric 4 and electrodes 5, 6. Such a filter is employed as a low impedance by-pass from the terminal lead 2 to the sleeve 9 for very and ultra-high frequencies. For this purpose, the filter may be considered as a specialized capacitor in which the ferrite bead 3 is introduced to obtain a low by-pass impedance through the capacitor elements 4, 5 and 6, and the term capacitor is used in this description and the following claims in a broad sense to include both simple capacitors and more complex circuit components such as filters in which magnetic material is present to provide particular impedance characteristics.

I claim:

1. In a capacitor the combination comprising a dielectric of tubular configuration having an electrode on the inner surface thereof and a second electrode on the outer surface thereof, an elongated sleeve encircling the dielectric and second electrode which is formed from a resilient wire extending in tight helical turns about the surface of the dielectric along a major length thereof and which at one end of the sleeve spirals radially outward from the dielectric in closely adjacent turns to form a flange substantially normal to the dielectric that presents a substantially plane face adapted for mounting the capacitor, and a coat of solder on the surface of the sleeve stiffening the flange and adhering the sleeve to the second electrode.

2. In a capacitor the combination comprising a central lead wire extending throughout the length of the capacitor; a ceramic dielectric of tubular configuration encircling said lead wire having a first electrode on the inner surface thereof and a second electrode on the outer surface thereof; an electrical connection between the lead wire and said first electrode; a sleeve encircling the dielectric in tight engagement with the second electrode on the outer surface thereof which is formed of turns of a resilient wire extending helically about the surface of the dielectric along a major length thereof and which at one end spirals radially outwards from the dielectric in closely adjacent turns to form a disc-like mounting flange that is substantially flat; and a solder on the surface of the sleeve stiffening said flange and adhering the sleeve to the second electrode.

3. A capacitor in accordance with claim 2 wherein the helical turns of the sleeve present an opening smaller than the outside diameter of said second electrode preparatory to placing the sleeve about the dielectric and second electrode.

References Cited in the file of this patent

UNITED STATES PATENTS

| 2,758,268 | Peyssou | Aug. 7, 1956 |
| 2,762,989 | Johnson | Sept. 11, 1956 |

FOREIGN PATENTS

| 560,372 | Great Britain | Mar. 31, 1944 |